STEP-BY-STEP SYSTEM

Filed March 31, 1953 2 Sheets-Sheet 1

INVENTOR
WILLIAM W. PHARIS
BY
T. L. Bowes
ATTORNEY

INVENTOR
WILLIAM W. PHARIS
BY
T. L. Bowes
ATTORNEY

United States Patent Office 2,823,264

Patented Feb. 11, 1958

2,823,264

STEP-BY-STEP SYSTEM

William W. Pharis, Rochester, N. Y., assignor, by mesne assignments, to General Dynamics Corporation, a corporation of Delaware Application March 31, 1953, Serial No. 345,823

7 Claims. (Cl. 179—18)

Figures 1, 2:
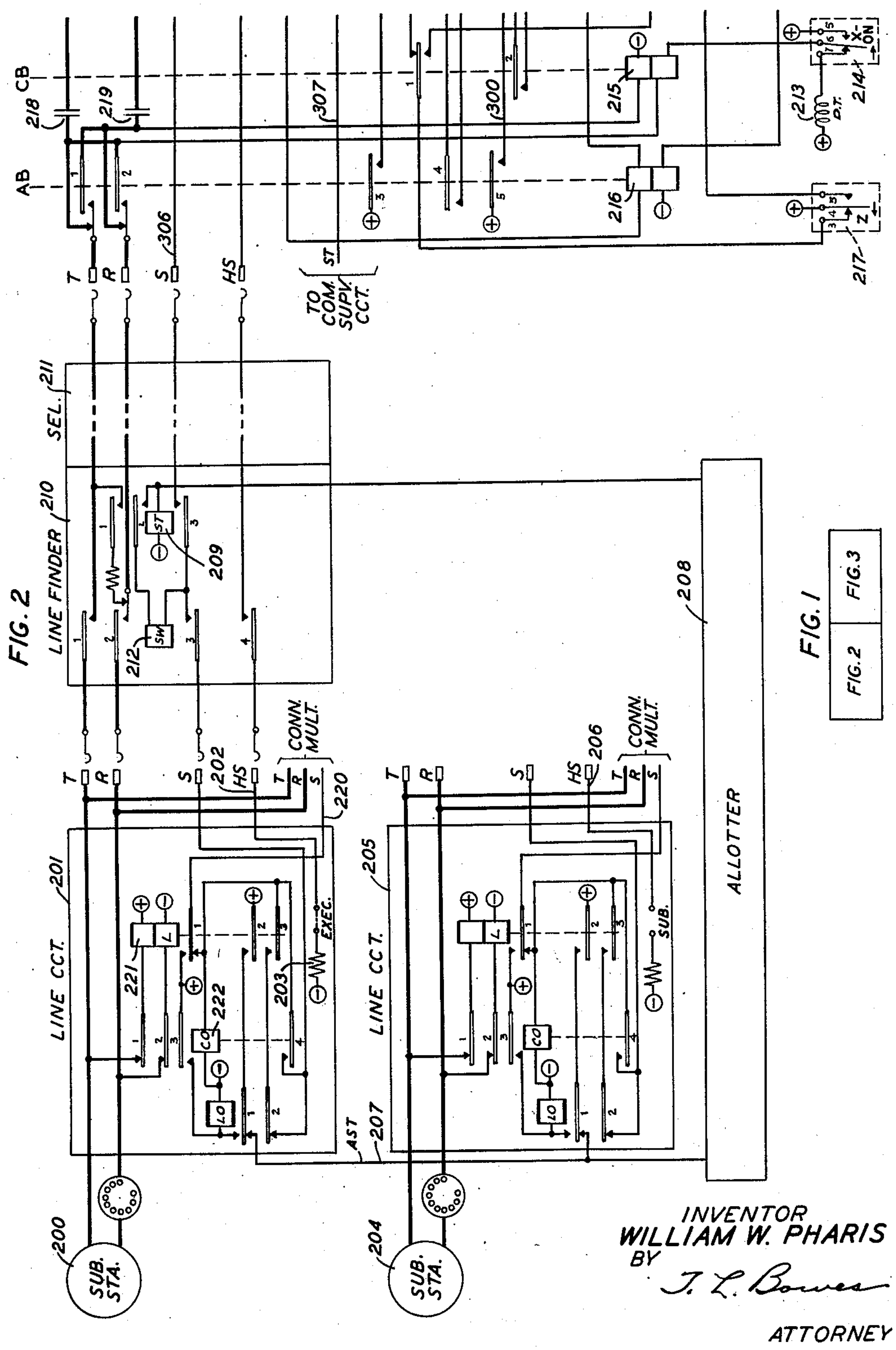

This invention relates to telecommunication systems and particularly to special service arrangements in step by step machine switching systems.

The object of the invention is to provide simple and economical means particularly in a step by step system for flexible operation and to provide for a number of special features therein such as code calling, executive right of way and conference calling service.

In certain telephone systems it is desirable to have a means whereby a party who is absent from his usual location and who fails to answer an incoming call to his telephone, may be located. This is conventionally done by the use of a code calling system by which the called subscriber may be located and alerted. Wherever this called subscriber happens to be, he will respond to the summons of the code call sounded throughout the building or the territory served by the telephone system and will establish telephone connection with the calling party.

In accordance with the present invention, a code calling system is incorporated in a step-by-step telephone system so that when the calling subscriber fails to get a response from a called party, he may then dial a special number to operate a code calling device. This will then sound a code on bells or other devices which will summon the called party who will thereupon go to the nearest telephone substation and establish communication with the calling subscriber in any conventional manner.

In accordance with the present invention, the calling subscriber may, after enabling the code call system, dial a connection to a special conference circuit and there await the response of the called subscriber. The called subscriber being alerted, will go to the nearest telephone substation and also dial a connection to this special conference circuit, whereupon he will come into communication with the calling party. The two may then talk together over the conference circuit or make other arrangements to talk over some other circuit where they may have more privacy.

The code calling system may also be used to summon a number of different subscribers so that all may come in on the conference circuit.

A group of called parties may be summoned in any other conventional manner as by appointment, by direct calls over their telephone lines by an operator or secretary, or by a code call directed to a group rather than a particular individual. The number of parties who may join a conference on the said conference circuit is limited only by the number of connectors which are available for simultaneous service.

Another special feature is known as the executive right of way service. In accordance with this arrangement a line provided for an executive may be equipped with a means whereby a call from that line will make a talking connection to any other line despite the fact that a busy connection may be encountered. Means is further provided so that if the called party hangs up before the party on the executive right of way line has attracted his attention, or before a conversation has terminated, the called party will be automatically recalled. It may happen that the party having the right of way privileges does not wish to break in on or disturb a conversation in progress and so he merely waits until the conversation has terminated and the called party has hung up, whereupon the called party will be recalled immediately and automatically.

A feature of the invention is the use of a relay which when energized will allow a connector to ignore a busy signal and establish a transmission circuit to a called line. This relay may be responsive to a plurality of various conditions, by way of example, a special condition imposed on a particular calling line or a different special condition imposed on a particular called line. The particular condition imposed on a calling line is in the form of a special connection in the line circuit thereof and will reach the connector over a connection extended thereto from the line circuit and the train of switches used up to the connector. The particular condition imposed on a called line is in the form of a special connection to the connector terminals in which the said called line terminates, this line having no conventional line circuit.

Another feature of the invention is a permanent busy condition imposed on the terminals of a conference connection to prevent the application of ringing current thereto. Since the right of way relay is doubly employed for setting up executive right of way connections and conference connections and since the first involves the application of ringing current to the called line under given conditions outlined above, it is important that this recall operation be prevented in a conference connection. Therefore, the conference connection has a permanent busy condition imposed thereon.

Another feature of the invention is the combination of calling lines each equipped with a line circuit, particular ones of which may have a special service marking, called lines devoid of a line circuit each one of which has a special service marking and a connector arranged to respond to special service marking to make connections to called lines regardless of any busy condition encountered.

Still another feature of the invention is a means in a connector equipped with a means responsive to a special service marking for making connection to a busy line for selectively responding to the source of a special service marking and for setting up a different operating condition in accordance with the said difference in the source. By way of example, the connector is equipped with a circuit arrangement for camping on a busy line and for recalling such line when the busy condition is relaxed. If the special service marking is derived from a line circuit, then this camping on a busy circuit arrangement will become effective but if the special service marking is derived from a called line which is devoid of a line circuit, then this camping on a busy circuit arrangement will be prevented from operating.

Other features will appear hereinafter.

Figure 3:
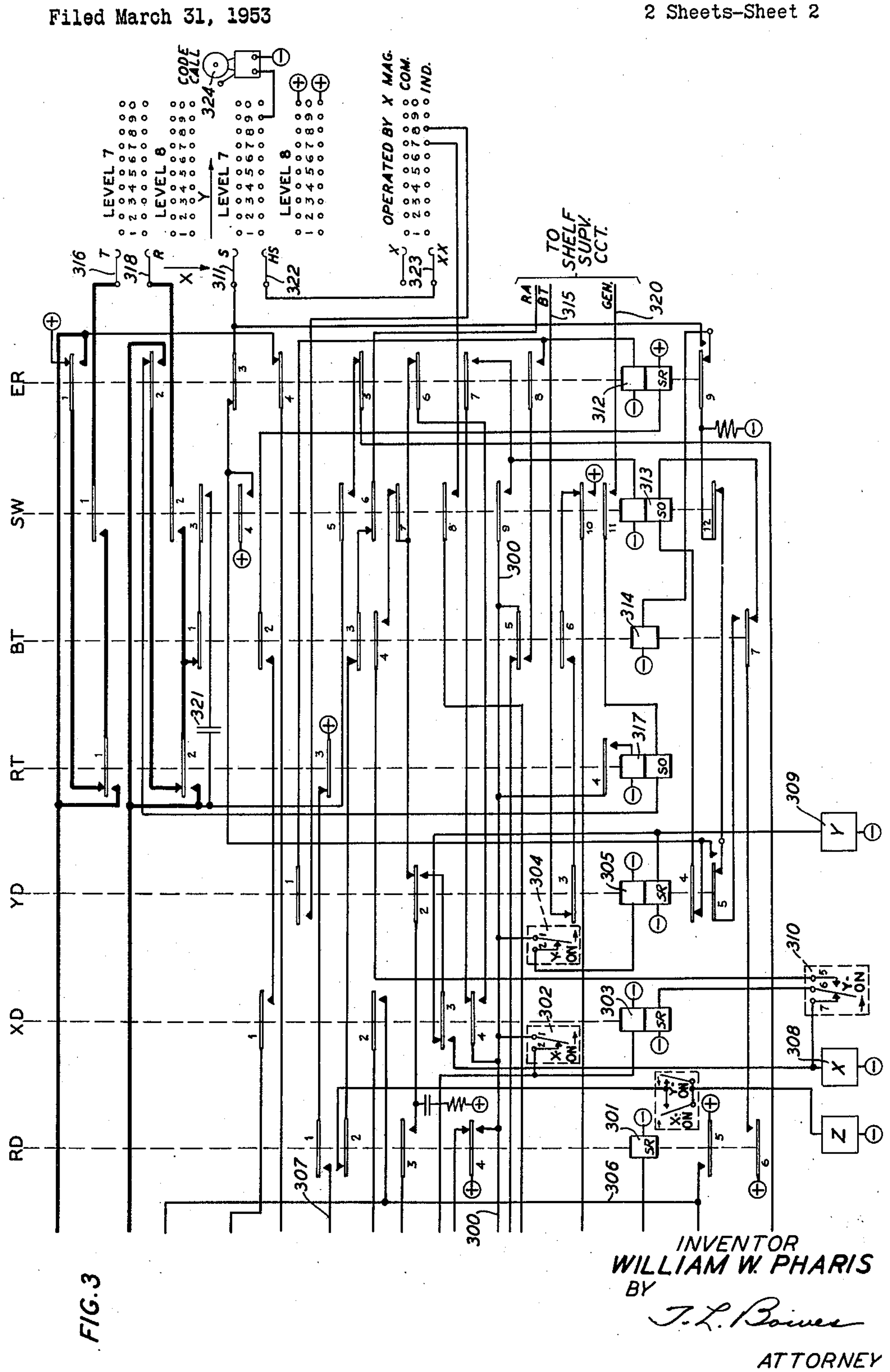

The drawings consist of two sheets having three figures, as follows:

Fig. 1 is a block diagram showing how Figs. 2 and 3 may be placed to form a schematic circuit diagram of so much of a telecommunication system as is necessary to disclose the present invention.

Fig. 2 contains a showing of two calling substations, line circuits for each, an allotter, a line finder, an indication of a selector and part of a connector, and Fig. 3 shows the remainder of the connector circuit.

Station 200 is served by its individual line circuit 201, in which the HS conductor 202 is strapped to a resistance 203 and a source of battery. This represents an executive's line. A station 204 is served by its individual line circuit 205 and in this case the HS conductor 206 is left unconnected to the corresponding resistance and battery. Both of these line circuits will affect the AST stator wire 207 to operate the allotter 208 to, in turn, cause the operation of the ST start relay 209 in an allotted line finder so that such line finder will pick up the calling line. If we assume in this case that the subscriber at substation 200 is making a call, then the line finder will place its brushes on the terminals coming from the line circuit 201 and as soon as the selector 211 has been seized a ground returned on the sleeve conductor through the front contact and armature 3 of the ST relay 209 will cause the operation of the SW switch through relay 212 so that the four conductors from the line circuit 201 will be extended through the line finder 210 to the selector 211.

The subscriber will dial a number to set the selector and we will assume, in this case, that the connector shown partly in Fig. 2 and in Fig. 3, will be selected. Thereupon the calling bridge will be closed in a circuit from ground, the dial tone coil 213, the springs 7 and 6 of the off normal set shown in rectangle 214, lower winding of the CB relay 215, normal contacts of armature 1 of the AB relay 216, tip of the line, back through the bridge supplied at the substation 200, ring of the line, normal contacts of armature 2 of the AB relay 216, upper winding of the CB relay 215 to battery. The CB relay, in operating, extends ground through springs 4 and 3 of the Z magnet contacts shown in rectangle 217, armature 1 and front contact of the CB relay 215, winding of the RD relay 301 to battery. This relay operates and through its armature 4 and front contact places ground on the master ground wire 300. This is followed by the extension of ground through the X off normal contacts shown in rectangle 302 and the upper winding of the XD relay 303 to battery to operate the XD relay. In like manner, ground on the master ground wire is extended through the Y off normal contacts shown in rectangle 304, the upper winding of the YD relay 305 to battery, so that this relay becomes operated. The operation of the RD relay extends ground through its armature 5 and front contact to the sleeve lead 306 to hold the SW relay of the selector, the SW relay 212 of the line finder and the cut off relay 222 of the line circuit. The start lead 307 is also grounded through armature 1 and front contact of the RD relay for conventional purposes.

The calling subscriber now dials the first digit. This operation consists of the transmission of a train of impulses each of which consists of a short opening of the line. On the first impulse of the dial, the loop to the CB relay 215 is opened and this relay restores for a short interval thereby extending the ground on its armature 1 through the back contact thereof, through armature 3 and front contact of the RD relay 301, the armature 2 and front contact of the YD relay 305, the armature 3 and front contact of the XD relay 303 to the X magnet 308, whose function is to step the brushes of the connector forward in their primary movements. At the right hand end of Fig. 3 the terminals reached by the various brushes are shown. The T, R, S and HS brushes will be moved in the primary direction until a particular level has been selected. The primary and XX brushes will be moved in the secondary direction during the X movement of the switch. During the following secondary movement of the switch under the influence of the Y magnet 309, the T, R, S and HS brushes will be moved in the secondary direction but the X and XX brushes will not be moved.

Upon the first movement of the X magnet 308, the X off normal contacts including those shown in the rectangle 302 will be operated so that the original circuit for the XD relay 303 will be opened. However, the ground extended to the X magnet 308 will also be extended through springs 7 and 6 of the Y off normal set 310 and thence through the lower winding of the XD relay 303 so that the X magnet 308 will respond separately to each pulse of the train, whereas the XD relay 303 due to its slow releasing characteristics, will respond to the train as a whole and after this train has terminated will, in a short interval, release.

The calling subscriber now dials the second digit. The CB relay responds to the pulses of this train of pulses in the same manner, but this time the circuit from armature 2 and front contact of the YD relay to armature 3 of the XD relay now extends through the back contact of this armature and thence in parallel to the lower winding of the YD relay 305 and the Y magnet 309. Upon the first step of the switch in the Y direction, the Y off normal springs including those shown in rectangle 304 are operated so that the YD relay is now disconnected from the master ground wire 300 and depends for its further operation on the timing of the pulses of this train. In the same manner as before described, the Y magnet 309 responds to the pulses separately and the YD relay 305 responds to the train as a whole. When this train has terminated, the YD relay, in an interval measured by its slow releasing characteristics, will release.

At the end of this train of pulses, after the brushes have been set on the terminals of the selected called line but before the YD relay can release, a test is made of the called line for its busy or idle condition. If the line is busy a ground will be found on the sleeve terminal and this ground will now be extended through the sleeve brush 311, armature 3 and back contact of the ER relay 312, alternate contacts of armature 5 of the YD relay 305, back contact and armature 12 of the SW relay 313, armature 9 and back contact of the ER relay 312, winding of the BT busy test relay 314 to battery. The busy test relay will operate in this circuit and will lock upon the release of the YD relay 305 in a circuit including the back contact and armature 5 of the YD relay 305, front contact and armature 7 of the BT relay 314, front contact and armature 6 of the RD relay 301 to ground.

Busy tone is now extended from a source of busy tone connected to the conductor 315, back contact and armature 3 of the YD relay 305, front contact and armature 6 of the BT relay 314, back contact and armature 10 of the SW relay 313, the upper winding of the AB relay 216, armature 4 and back contact of the ER relay 312 to the tip of the line, whence it will be transmitted to the calling subscriber in the conventional manner.

Let us now assume that the executive using the line 200 wishes to get into communication with the called subscriber despite the fact that a busy condition has been reported. He will thereupon operate his dial to transmit any one digit. The CB relay responds and extends ground from its armature 1 and back contact through armature 3 and front contact of the RD relay 301, armature 2 and back contact of the YD relay 305, armature 7 and back contact of the SW relay 313, front contact and armature 4 of the *bt* relay 314, springs 5 and 6 of the *y* off normal set shown in rectangle 310, now operated since the switch has been set in its Y direction, and thence through the lower winding of the XD relay 303. The XD relay now closes a locking circuit for itself from ground on the master ground wire 300 through armature 4 and front contact of the XD relay, armature 6 and back contact of the ER relay 312, armature 7 and back contact of the SW relay 313 and thence over the circuit just described to the lower winding of the XD relay 303. Upon the operation of the XD relay a circuit will be established from battery through the resistance 203 in the line circuit, the HS lead 202 through the HS lead in the line finder and selector, armature 1 and front contact of the XD relay 303, front contact and armature 2 of the BT relay 314, lower winding of the SR relay 312 to ground, whereupon the ER relay will operate. This relay now closes a locking circuit from ground on the master ground wire 300, through armature 5 and front contact of the BT relay 314, armature 8 and front contact of the ER relay 312, upper winding thereof to battery. The operation of the ER relay also opens the locking circuit for the XD relay 303 just previously described and this relay in an interval measured by its slow releasing characteristics, will release. Through its front contact and armature 7 the ER relay prepares a circuit for the upper winding of the SW relay 313 which, upon the release of the XD relay 303, will be closed through the back contact and armature 4 thereof to ground on the master ground wire 300. The ER relay at its armatures 4 and 5, opens the circuit of the AB relay 216 and at its armature 3 opens the circuit from the sleeve brush 311 so that the BT relay 314 will now be connected to the sleeve brush through the alternate contacts of armature 9 of the ER relay 312.

The SW relay operates and locks through its front contact and armature 9 to the ground on the master ground wire 300. The SW relay will also close a circuit from the tip brush 316, armature 1 and front contact of the SW relay 313, armature 1 and back contact of the ringing trip relay 317, armature 1 and front contact of the ER relay 312, transmission condenser 218 to the calling line thence back over the ring to condenser 219, front contact and armature 2 of the ER relay 312, back contact and armature 2 of the RT relay 317, front contact and armature 2 of the SW relay 313 to the ring brush 318 so that communication is established between the executive at station 200 and the parties concerned in the busy connection to which the selector has been moved.

If before the executive can alert the wanted party on the called line, this party hangs up, then the ground on the sleeve brush 311 will be released and the BT relay 314 will release. The holding circuit for the ER relay 312 is released at armature 5 of the BT relay 314 and this relay releases. The circuit is now in the condition that it would be if the called line had been found free and the YD relay had just released. Thereupon, a circuit will be extended from ground, armature 6 and front contact of the RD relay 301, armature 7 and back contact of the BT relay 314, the lower winding of the SW relay 313, armature 4 and back contact of the YD relay 305, armature 3 and back contact of the ER relay 312, the S brush 311 and thence through the sleeve wire in the line circuit, such as the sleeve wire 220, the armature 1 and back contact of the line relay 221, the winding of the cut off relay 222 to battery. This will result in the operation of the SW relay which thereupon locks through its front contact and armature 9 to the ground on the master ground wire 300. Thereupon ringing current transmitted over the geneator lead 320 will extend through front contact and armature 11 of the SW relay 313, the lower winding of the ring trip relay 317, back contact and armature 2 of the ER relay 312, back contact and armature 2 of the RT relay 317, front contact and armature 2 of the SW relay 313, the ring brush 318 to one terminal of the called line thence out over the ringing circuit of the called line back to the tip brush 316, armature 1 and front contact of the SW relay 313, armature 1 and back contact of the RT relay 317, armature 1 and back contact of the ER relay 312 to ground. The called party will be summoned in this manner.

During the application of ringing current to the called line, a portion of this current will be delivered through the back contact and armature 1 of the BT relay 314, armature 3 and front contact of the SW relay 313, condenser 321 to the circuit of the calling party so that he will know that the called party is being rung.

When the called party answers, the circuit for the AB relay 216 extended through armatures 4 and 5 and back contacts of the ER relay 312 to the called line will be operated. The operation of the AB relay will reverse the battery to the calling line for conventional purposes.

The release of the connection is conventional. In this case since the AB relay 216 supplies ground to the master ground wire 300 by its front contact and armature 5, the arrangement is that known as last party release so that the connector is held operated until both parties have released.

In the representation of the terminals reached by the T, R, S and HS brushes it will appear that when these brushes are driven first to level 8 and then in their Y direction to the zero terminals (line number 80) both the S and the HS brushes will be grounded. The line will appear to be busy through the connection of ground to the S brush 311. The HS brush 322 is connected to the XX brush 323 and since this brush has been driven to its number 8 terminal, the ground picked up by the HS brush will be extended through the front contact and armature 1 of the YD relay 305, during its slow releasing period, thence through the upper winding of the ER relay 312 to battery. The ER relay operates and locks in the circuit hereinbefore described. Thus the ER relay may be operated by any calling subscriber if the switch is driven to the conference circuit on line number 80. If the calling subscriber now dials any one digit then the ER relay will be released and the SW relay will be operated to cut through the talking circuit. The permanent ground connection to the sleeve brush 311 will prevent any application of ringing current to the conference circuit. It may be noted that any number of parties may make connection to this conference circuit, the number being limited only by the number of available connectors in the system.

This connector also provides for a code calling circuit which may be useful in an office or in a factory. If a called subscriber does not answer his telephone, then he may be summoned by means of a code call which consists of a series of bells or other devices about a plant which will attract the attention of the absent called party. This called party may then reach the nearest telephone and dial the conference circuit where he will find the calling party is awaiting him. They may confer on this conference circuit or make other arrangements for some other telephonic connection.

The code call circuit, as illustrated by the connections to the connector bank terminals, is connected to line number 79, that is, when the XX brush is connected to its number 7 terminal and the HS brush is connected to the ninth terminal in its level 7.

The terminals of line 79 will be connected to an ordinary line circuit, so that when the circuit has been reached by a connector and found idle, the SW cut through relay may be operated.

When this number has been dialed then the calling subscriber may dial any particular code which will summon the called party. It will be understood that the single stroke bell 324 is merely representative of a code calling circuit and represents a series of devices wired about the plant in such positions that the code will be heard by everyone. As the calling subscriber dials, the CB relay will release as usual and a connection will be extended from ground on the master ground wire 300, armature 5 and back contact of the BT relay 314, armature 2 and front contact of the CB relay 215, armature 8 and front contact of the SW relay 313, terminal 7 reached by the XX brush 323, the HS brush 322 on its terminal 9 and thence through the code call circuit represented by the bell 324. In this manner the called subscriber missing from his telephone, may be summoned.

What is claimed is:

1. In a telephone system, a connector for extending connections to called lines, a special service relay in said connector for conditioning said connector to extend a connection to a called line having a busy potential connected thereto, and means for operating said relay from a calling line extended to said connector and alternatively from a particular called line to which said connector has extended a connection.

2. In a telephone system, a connector for extending connections to called lines, calling means automatically responsive to the extension of a connection by said connector to an idle called line, a special service relay in said connector, a busy test relay in said connector responsive to a busy condition encountered by said connector, said special service relay when operated rendering said busy test relay unresponsive to a said busy condition, means for operating said special service relay including permanent connections made to particular lines acting as calling lines and permanent connections made to particular called lines, a circuit controlled by said special service relay for calling a busy called line responsive to the removal of said busy condition and means associated with certain of said called lines for maintaining a permanent busy condition thereon to prevent the operation of said calling means.

3. In a telephone system, calling and called lines, a connector for extending connections from calling to called lines, means in said connector for testing the idle or busy condition of called lines, means in said connector for barring connections to busy called lines, means in said connector for disabling said last means, and means permanently associated with said calling and said called lines for controlling said disabling means.

4. In a telephone system, calling and called lines, a connector for extending connections to called lines, means in said connector for testing the idle or busy condition of called lines, means in said connector for barring connections to busy called lines, certain of said called lines having connections for marking said lines permanently busy and other connections for marking said lines for special service, means in said connector responsive to said special service marking for disabling said barring means.

5. In a telephone system, lines each having a line circuit for calling and other lines consisting only of multiplied connector terminals, a connector for extending connections from calling lines to said lines, means in said connector for barring connections to busy lines, means for temporarily disabling said barring means, each said other line having a permanent busy marking connection and each having also a special service connection, and means in said connector responsive to said special service connection for operating said disabling means.

6. In a telephone system, lines each having a line circuit for calling and other lines consisting only of multiplied connector terminals, a connector for extending connections from calling lines to said lines, means in said connector for barring connections to busy lines, means for temporarily disabling said barring means, each said other line having a permanent busy marking connection and each having also a special service connection, certain of said line circuits having a special service connection, and means in said connector responsive to said special service connections for operating said disabling means.

7. In a telephone system, lines each having a line circuit for calling and other lines consisting only of multipled connector terminals, selective means including a connector for extending connections from said lines equipped with said line circuits to any of said lines, said line circuits and said selective means having tip, ring, sleeve and help sleeve circuits, certain of said lines having a battery connection to its said help sleeve connection within its said line circuit, certain of said other lines having a permanently grounded sleeve and help sleeve connection within said multipled connector terminals, means in said connector responsive to a grounded sleeve associated with a called line for barring an effective connection to such called line, and means for temporarily disabling said barring means responsive to a battery connection on the help sleeve circuit extended thereto from a calling line or responsive to a grounded help sleeve circuit encountered by said connector on a connection extended to one of said other lines.

References Cited in the file of this patent

UNITED STATES PATENTS

| | | |
|---|---|---|
| 1,478,022 | Carpenter | Dec. 18, 1923 |
| 1,628,358 | Friendly | May 10, 1927 |
| 1,763,157 | King | June 10, 1930 |
| 2,352,492 | Ostline | June 27, 1944 |
| 2,444,033 | Cohrt | June 29, 1948 |
| 2,552,799 | Lomax | May 15, 1951 |

U. S. DEPARTMENT OF COMMERCE

PATENT OFFICE

CERTIFICATE OF CORRECTION

Patent No. 2,823,264 February 11, 1958

William W. Pharis

It is hereby certified that error appears in the printed specification of the above numbered patent requiring correction and that the said Letters Patent should read as corrected below.

Column 3, line 2, for "stator" read -- starter --; column 4, line 55, for "bt" read -- BT --; same line, for "y" read -- Y --; column 7, lines 34 and 35, and column 8, line 2, for "multiplied" read -- multipled.

Signed and sealed this 8th day of April 1958.

(SEAL)

Attest:

KARL H. AXLINE

Attesting Officer

ROBERT C. WATSON

Commissioner of Patents